(12) United States Patent
King (10) Patent No.: US 7,033,480 B2
(45) Date of Patent: Apr. 25, 2006

(54) PROCESS FOR RECOVERING PLATINUM GROUP METALS FROM MATERIAL CONTAINING BASE METALS

(75) Inventor: James A. King, West Vancouver (CA)

(73) Assignee: Placer Dome Technical Services Limited (CA)

(*) Notice: Subject to any disclaimer, the term of this patent is extended or adjusted under 35 U.S.C. 154(b) by 440 days.

(21) Appl. No.: 10/235,909

(22) Filed: Sep. 6, 2002

(65) Prior Publication Data

US 2004/0045405 A1 Mar. 11, 2004

(51) Int. Cl.
- C25C 1/12 (2006.01)
- C22B 3/08 (2006.01)
- C22B 3/26 (2006.01)

(52) U.S. Cl. ........................ 205/580; 205/584; 205/589; 75/743; 75/744; 204/234; 266/101; 266/170

(58) Field of Classification Search ............... 75/743, 75/744; 204/234; 205/580, 584, 589; 266/101, 266/170

See application file for complete search history.

(56) References Cited

U.S. PATENT DOCUMENTS

| | | | |
|---|---|---|---|
| 3,775,099 A | 11/1973 | Coffield et al. | 75/119 |
| 3,855,125 A | 12/1974 | Lin | 210/46 |
| 3,928,153 A | 12/1975 | Gendron et al. | 204/112 |
| 4,118,221 A | 10/1978 | Ettel et al. | 75/108 |
| 4,150,976 A * | 4/1979 | Dain | 75/719 |
| 4,201,648 A | 5/1980 | Subramanian et al. | 204/112 |
| 4,243,498 A | 1/1981 | Sherwood et al. | 204/112 |
| 4,323,541 A | 4/1982 | Saarinen et al. | 423/37 |
| 4,337,226 A | 6/1982 | Peasley et al. | 423/22 |
| 4,435,369 A | 3/1984 | Simpson | 423/147 |
| 4,571,262 A | 2/1986 | Kerfoot et al. | 75/101 R |
| 5,211,745 A | 5/1993 | Motteram et al. | 75/743 |
| 5,344,479 A | 9/1994 | Kerfoot et al. | 75/743 |
| 5,783,057 A | 7/1998 | Tomita et al. | 205/99 |
| 6,039,790 A | 3/2000 | Hultholm et al. | 75/739 |
| 6,206,951 B1 | 3/2001 | Fugleberg | 75/743 |

FOREIGN PATENT DOCUMENTS

| | | |
|---|---|---|
| EP | 0 155 250 | 9/1985 |
| SU | 1225807 | 4/1986 |
| WO | WO 03/045567 A1 | 6/2003 |

OTHER PUBLICATIONS

Habashi, F., *Handbook of Extractive Metallurgy*, (1997) pp. 722–724, 732, 750–751.

Lonmin Platinum, Base Metal Refinery: Process Description. Aug. 1999.

Metallurgical Process: Merensky Concentrator with figures, pp. 1–7, no date (Prior to Application Filing Date).

Nico Steenekamp et al., *Operations of and Improvements to the Lonrho Platinum Base Metal Refinery*, 1999 EPD Congress, The Minerals, Metals & Materials Society (B. Mishra ed., 1999) pp. 365–378.

PCT International Preliminary Examination Report for Intl. App. No. PCT/IB02/04890 dated Jan. 1, 2005.

* cited by examiner

*Primary Examiner*—Melvyn Andrews
(74) *Attorney, Agent, or Firm*—Sheridan Ross PC (57) ABSTRACT

The process of the present invention recovers platinum group metal(s), such as platinum and palladium, from PGM-containing materials containing base metals, such as copper and nickel. The process controls sulfur levels by using solvent extraction 306 to remove acid in the nickel recovery circuit. The acid product 326 can then be neutralized and/or recycled as desired.

34 Claims, 3 Drawing Sheets

PROCESS FOR RECOVERING PLATINUM GROUP METALS FROM MATERIAL CONTAINING BASE METALS

FIELD OF THE INVENTION

The present invention relates generally to processes for recovering metals from metal-containing materials and specifically to processes for recovering platinum group and base metals from platinum group- and base metal-containing materials.

BACKGROUND OF THE INVENTION

The platinum group metals or PGMs (platinum, palladium, rhodium, iridium, osmium, and ruthenium) are becoming increasingly important to the global economy. Platinum is used for jewelry and chemical catalysts, and blends of platinum, palladium, and rhodium are used in catalytic converters.

PGMs frequently occur together in naturally occurring sulfide minerals along with base metals, such as nickel, copper, and iron. By way of illustration, a typical PGM sulfide ore contains from about 0.01 to about 0.3 oz/ton platinum, from about 0.01 to about 0.3 oz/ton palladium, from about 0.01 to about 0.1 oz/ton rhodium, and also contains variable amounts of nickel, copper, and iron.

Figure 1:
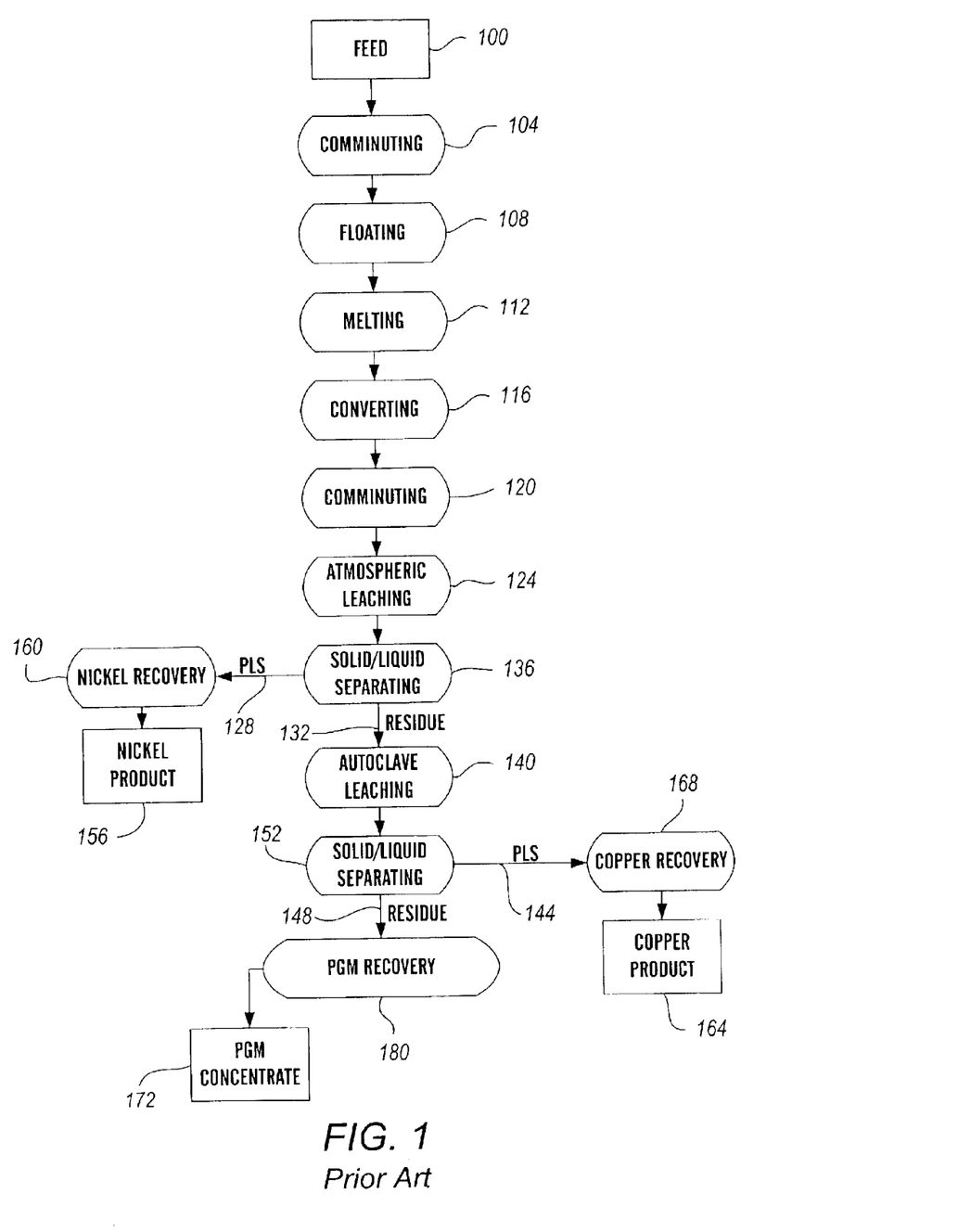
FIG. 1 depicts a prior art process for recovering PGMs and base metals from a feed material and FIGS. 2A and B depict a first process embodiment according to the present invention for recovering PGMs and base metals from a feed material

FIG. 1 depicts a typical process for recovering platinum and palladium and base metals from a mined material. The feed 100 is comminuted 104, the comminuted material floated 108 to form a flotation concentrate (containing PGMs and base metals as sulfides), the concentrate melted 112 to form a furnace matte (containing the PGMs and base metals as sulfides) and a stag (containing the silicate, chromite, and other gangue minerals), the matte converted 116 to remove some sulfur and most of the iron and form a converter matte (containing the PGMs and copper and nickel base metals), the converter matte comminuted 120 to form a comminuted converter matte, the comminuted converter matte atmospheric leached 124 with sulfuric acid to form a first pregnant leach solution 128 (containing most of the nickel, and iron as ferrous) and a first leached material or residue 132 (containing most of the PGMs, some nickel, and most of the copper), the first leached material 132 separated 136 from the first pregnant leach solution 128, the first leached material 132 autoclave leached 140 using sulfuric acid to form a second pregnant leach solution 144 (containing the balance of the nickel, the copper, and sulfuric acid) and a second leached material or residue 148 (containing the PGMs and iron oxides), and the second leached material 148 separated 152 from the second pregnant leach solution 144. A nickel product 156 is recovered 160 from the first pregnant leach solution 128, a copper product 164 is recovered 168 from the second pregnant leach solution 144, and the PGM concentrate 172 containing platinum, palladium and rhodium is recovered 180 from the second leached material 148.

A significant problem with this circuit is the disposal of the sulfur in the sulfide minerals. Although a significant portion of the sulfur is removed in the converting step 116 (as sulfur dioxide gas), the sulfur contained in the matte which feeds the base metal refinery must be removed from the circuit to control sulfur levels in the various steps and maintain a sulfur balance within the process.

Typically, sulfur levels are controlled by removing sulfur in the nickel recovery step 160. One approach to removing sulfur is to crystallize the nickel as nickel sulfate as a nickel product 156. Crystallization of the nickel as nickel sulfate, however, significantly reduces the value of the nickel product 156. Yet another approach is to recover the nickel by electrowinning. Electrowinning of the nickel produces sulfuric acid at the anode. A bleed stream is removed from the nickel (and/or copper) electrowinning circuits, and the sulfuric acid in the bleed stream is disposed of as a sulfate by neutralizing the sulfuric acid with a base. Sodium hydroxide is commonly used as the base. Sodium hydroxide is expensive and produces a product, namely sodium sulfate, which is difficult to dispose of and has a resale value that is much less than that of the sodium hydroxide from which it is formed. Calcium hydroxide, or oxide, or carbonate, another possible base, is much less expensive than sodium hydroxide but produces calcium sulfate or gypsum. Gypsum levels in the solution are difficult to control, and gypsum can precipitate in the circuit due to changes in temperature and ionic strength, thereby creating operational problems, especially within the nickel electrowinning circuit. Moreover, neutralizing the bleed stream with calcium hydroxide can increase metal losses (and decrease metal recoveries) as the metal hydroxide precipitates can be difficult to separate from the calcium sulfate precipitates.

SUMMARY OF THE INVENTION

These and other needs are addressed by the various embodiments and configurations of the present invention. The process of the present invention generally removes the excess sulfur in the nickel and/or copper recovery steps by a selective technique such as solvent extraction, thereby permitting the excess sulfur to be separated into a relatively pure sulfuric acid stream which can then be either recycled to the process and/or neutralized with a desired base. The process of the present invention can be used on any sulfur-containing material, such as sulfide ores, tailings, concentrates, leach residues, and the like.

In one embodiment, the process includes the steps of:

(a) forming, such as by melting and converting, the material into a matte, which contains at least most of the PGM(s) and the copper and/or nickel in the material, and also a furnace slag (the furnace slag being between about 50 and 95 wt % of the material);

(b) leaching the matte with an acid-containing lixiviant to form a first pregnant leach solution, which contains at least most of the nickel in the matte and a first leach residue, which contains some nickel and at least most of the copper and PGM(s) in the matte;

(c) recovering the nickel to form a first product, which contains at least most of the nickel in the first pregnant leach solution and a lean solution, which contains at least most of the acid initially in the form of nickel sulfate in the first pregnant leach solution;

(d) removing (preferably by solvent extraction) at least some of the acid from the lean solution to form an acid product and a treated lean solution;

(e) optionally forming at least some of the acid product into a salt, such as gypsum by neutralizing with lime; and (f) recovering at least most of the PGM(s) (which typically is platinum and/or palladium) in the first leach residue.

The process can have a number of advantages. For example, the acid product can have a high degree of purity and can eliminate the need to purchase fresh sulfuric acid for use in the various leaching steps. Because the acid product is removed from the nickel recovery circuit, the process can permit the use of a relatively inexpensive base, such as calcium hydroxide/oxide or lime, for acid neutralization. If gypsum clogs the vessels and conduits used for acid neutralization, nickel recovery can continue unimpaired. Because nickel cathode is being produced, the nickel cathode product can command a higher price than a nickel sulfate product. Solvent extraction can be highly selective for sulfuric acid compared to dissolved nickel, therefore having little impact on metal recoveries. Solvent extraction can recover at least most of the sulfuric acid while leaving at least most of the nickel in the lean solution (or in the inorganic phase).

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 2A:
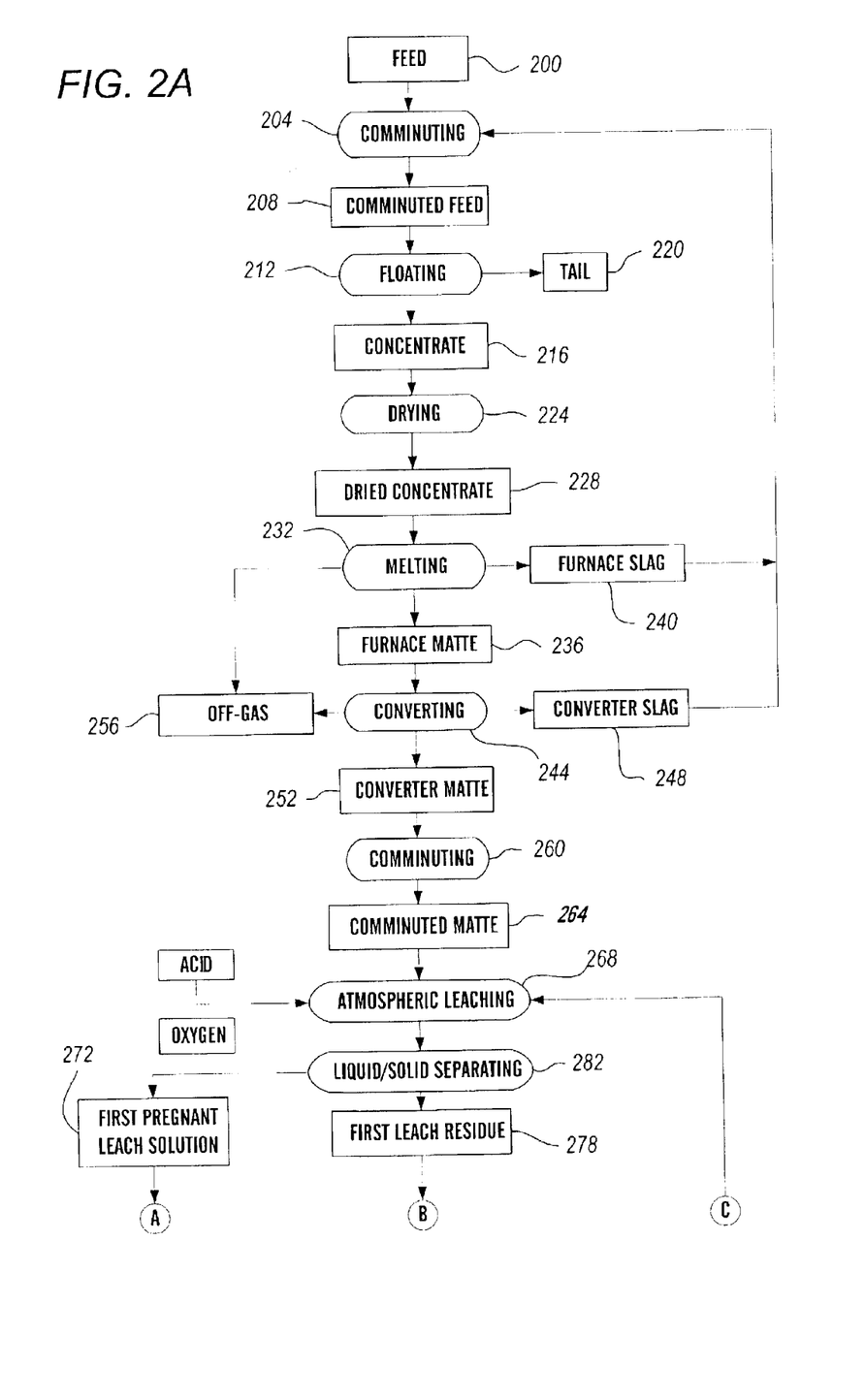
Figure 2B:
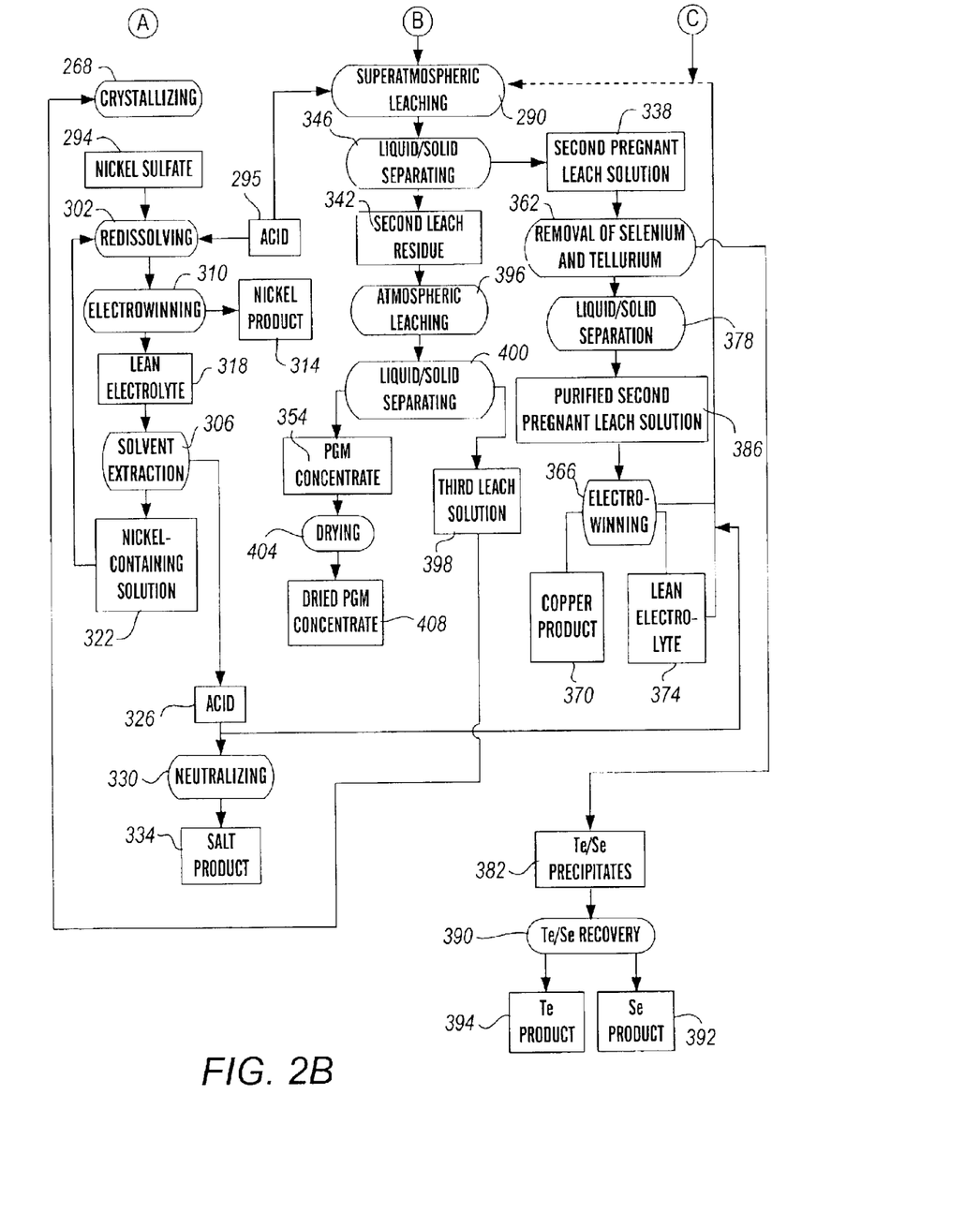

FIG. 2 depicts a first embodiment of the present invention.

The process can be used to recover PGMs and base metals from any feed material 200 containing the metals. For example, the feed material can include oxide, siliceous, and/or sulfur-bearing minerals, or be run-of-mine material or a partially or fully processed material such as a flotation concentrate, leach residue, or tailings. The feed material 200 typically includes the PGMs, base metals, and sulfur noted above.

In step 204, the feed material 200 is comminuted to a desired size distribution for flotation. Preferably, the $K_{80}$ size of the comminuted feed 208 ranges from about 1,000 to about 10 microns. The comminution can be performed by any suitable arrangement of crushers and/or grinding mills, with an open circuit configuration being preferred.

In step 212, the comminuted feed 208 is floated using flotation conditions conducive for floating sulfide minerals. The flotation is preferably configured to recover copper and nickel sulfides into the concentrate 216. All PGMs whether or not closely associated with copper and nickel, ideally will also be recovered into the concentrate 216. Typically, the flotation is conducted by first conditioning the comminuted feed 208 with a reagent suite, comprising, but not limited to, reagents, frothers and gangue depressants. The conditioned feed material is floated in a series of rougher flotation cells to form a rougher concentrate and rougher tailings. It may be beneficial to incorporate several stages of consecutive grinding and rougher flotation to maximize the recovery of PGMs and base metals in flotation and also maximize the grades of flotation concentrates produced. The rougher concentrate or concentrates, as the case may be, will be cleaned either individually or collectively, with or without regrinding, to produce a high grade cleaned concentrate as the final flotation product. Typically, the cleaned, final concentrate represents from about 0.25 to about 10 wt % of the comminuted feed 208 and contains at least about 50% of the PGMs and at least about 50% of the copper and nickel in the comminuted feed 208. More typically, it contains between 70 and 90% of the PGMs and base metals in the comminuted feed 208.

The concentrate 216 is thickened and dried, and the tailings 220 discarded. The concentrate 216 can be dried by any suitable technique, such as vacuum drying and thermal techniques. In the drying step 224, the water content of the concentrate 216 is typically reduced from about 15 to about 30 wt % to around 1 wt % in the dried concentrate 228.

In step 232, the dried concentrate 228 is melted to form furnace matte 236 (containing at least most and typically at least about 90% of the PGMs and copper and nickel in the dried concentrate 228) and furnace slag 240 (which contains at least most of the silica, chromite, and other gangue minerals in the dried concentrate 228). The furnace matte 236 typically is at least about 5 to about 50 wt % of the concentrate. Although any suitable furnace can be used, the melting is typically performed in a refractory brick lined vessel using submerged arc electrodes. Heating of the furnace occurs by resistive heating created by the electric current flowing through the dried concentrate. The molten material separates into two distinct strata, with the upper layer or slag being at a temperature of from about 1250 to about 1600° C. and a lower layer or furnace matte being at a lower temperature of from about 1100 to about 1400° C. A flux is typically used to improve separation of the silica, chromite, and gangue minerals from the valuable metal sulfides. The furnace slag 240 is recycled to comminuting step 204 discussed above.

The furnace matte 236 is converted in step 244 to form a converter slag 248 containing at least most of the iron oxide and at least most of the remaining silica, chromite and other gangue minerals in the furnace matte 236, an off-gas 256 containing sulfur, and a converter matte 252 containing typically at least most and more typically at least about 90% of the PGMs and copper and nickel in the furnace matte 236. The converter matte 252 typically contains from about 75 to about 80 wt % copper and nickel, about 1 wt % iron, about 20 wt % sulfur, and the PGMs. At least most of the sulfur in the furnace matte 236 is typically contained in the converter slag 248 and/or off-gas 256. Although any suitable furnace can be used, the converter is typically a cylindrical chrome magnesite brick lined vessel having a plurality of tuyeres through which air is blown. When the converter has been charged with furnace matte 236, the converter is rotated until the tuyeres are submerged and the air blows through the matte 236. The oxygen in the air reacts with the sulfur and the iron to produce sulfur dioxide gas and iron oxide, which combines with an added flux, such as silica and/or lime, to produce the converter slag 248.

An alternative furnace for converting is a top-blown rotary converter furnace, using oxygen enriched air to oxidize the sulfur. Gas volumes are reduced and better controlled with this type of furnace, thereby maximizing capture of sulfur dioxide emissions.

In one process configuration, the converter matte 252 is then poured into a ladle and granulated. The matte 252 is then pumped into a settling tank and dewatered.

The off-gas 256 from the melting furnace and converter is directed through particulate collectors to remove entrained particulates and maybe discharged through a stack to atmosphere. However, more preferable is to contact the off gases with a double alkali system to capture virtually all of the sulfur dioxide generated during the converter operation.

The converter slag 248 is typically either recycled to the comminuting step 204 above or recycled to the melting furnace.

In step 260, the converter matte 252 is comminuted using a suitable configuration of crushers and grinding mills (typically configured in a closed circuit) to form a comminuted matte 264 having a $K_{80}$ size typically ranging from about 10 to about 30 microns.

In step 268, the comminuted matte 264 is leached at atmospheric (or ambient) pressure using lean electrolyte from the copper EW plus some fresh make-up acid, preferably sulfuric acid, in the presence of molecular oxygen which is typically sparged into the initial leaching vessels. This leach produces a first pregnant leach solution 272 containing at least most (and typically from about 65 to about 99%) of the nickel in the comminuted matte 264. It also produces a first leach residue 278 containing at least most of the PGMs and copper with some of nickel in the comminuted matte 264. While not wishing to be bound by any theory, it is believed that a number of simultaneous reactions occur in the leaching step 268. Metallic nickel, haezlewoodite (or $Ni_3S_2$) and millerite (NiS) are each acid oxidized to nickel sulfate. In a metathesis reaction, any dissolved copper, present in the initial part of the leach, is subsequently precipitated, enabling the dissolution of additional nickel from the nickel sulfides in the feed. The dissolved nickel sulfide forms a relatively pure solution of nickel sulfate.

Through the metathesis reaction, the first pregnant leach solution 272 typically has a relatively high purity. Typically, the first pregnant leach solution 272 has a dissolved nickel concentration of about 100 g/l, though the nickel concentration can vary depending upon the mineralogical composition of the comminuted matte. The solution 272 contains at least a small concentration of other metals, typically ferrous iron and copper. A small but significant amount of the nickel, almost all the copper and PGMs in the comminuted matte 264 typically remain in the first leach residue 278.

To provide a first pregnant leach solution 272 of such high purity, the leach conditions are carefully controlled. The lixiviant preferably contains from about 2 to about 40 g/l free acid. Preferably, the pH is maintained at a level to precipitate any dissolved PGMs while maintaining at least most of the dissolved nickel in solution. The various oxidation reactions are exothermic. The operating temperature is typically maintained in the range of from about 70 to about 95° C. The leach is commonly performed in a series of vessels in cascade series.

In step 282, the first pregnant leach solution 272 is liquid/solid separated, typically in a thickener circuit, from the first leach residue 278. Flocculants can be employed to improve separation efficiency.

The first pregnant leach solution 272 may be filtered through a plate clarification filter to remove remaining particulate before reporting to the crystallizing step 286. The recovered filtered solids are added to the first leach residue 278 before the leaching step 290 (discussed below).

The first pregnant leach solution 272 is treated by techniques well-known to those of ordinary skill in the art to remove iron in solution before being pumped to a nickel crystallizer in step 268 via a circulation pump. The crystallizer operates in circulation with a heat exchanger to heat the first pregnant leach solution. The crystallizer operates under a partial vacuum to remove water vapor from the heated first pregnant leach solution. As the first pregnant leach solution 272 becomes progressively more concentrated, nickel sulfate crystallizes. The crystals grow until they can no longer be suspended by the upward solution velocity and then fall into the elutriation leg of the crystallizer, where they are removed from the circuit to a centrifuge. The centrifuge separates the crystals from the first pregnant leach solution to form nickel sulfate product 294.

In step 302, the nickel sulfate product 294 is redissolved in an agitated solution to form a rich electrolyte for electrowinning step 310. The solution typically includes a mineral acid 295, preferably sulfuric acid, and has a pH ranging from about pH 1 to about pH 5.0. Sufficient solution is used to provide a high enough dissolved nickel concentration after step 302 for effective nickel electrowinning and to avoid nickel sulfate precipitation.

In step 310, the rich electrolyte from redissolving step 302 is subjected to electrowinning, such as in a diaphragm electrolytic cell, to produce a nickel product 314 of relatively high purity and a lean electrolyte 318. While not wishing to be bound by any theory, it is believed that the following reactions occur:

The temperature of the solution during electrowinning typically ranges from about 40 to about 80° C.

After electrolysis, the lean electrolyte 318 typically contains from about 40 to about 80 g/l nickel and from about 30 to about 100 g/l sulfuric acid. The nickel product typically contains at least about 96% and more typically from about 98 to about 99.5% of the nickel in the comminuted matte 264.

As can be seen from the above reactions, sulfuric acid is produced at the anode, and the sulfuric acid level in the recirculating lean electrolyte must therefore be controlled. The control of the acid level is performed in step 306. Part or preferably all of the lean electrolyte 318 is subjected to solvent extraction in step 306 to collect sulfuric acid onto an organic phase (which is typically a mixture of a hydrocarbon diluent such as kerosene, Shellsol 2046, Conoco 170, an alcohol modifider such as octanol or tridecanol, and an organic extractant such as tertiary amines such as TEHA, and/or phosphine oxides such as CYANEX 923, or phosphate oxides such as TOPO. Solvent extraction 306 is typically performed in continuous counter current stirred reactors, at a temperature ranging from about 20 to about 60° C., and at an acid concentration ranging from about 30 to about 100 g/L $H_2SO_4$. Preferably, at least about 80% and more preferably from about 90 to about 99% of the sulfuric acid in the lean electrolyte 318 is removed in the organic phase.

The nickel-containing solution 322 (or the inorganic or aqueous phase in the solvent extraction step 306) is separated from the organic phase by conventional equipment such as mixer/settler or pulsed column, and then recycled to the redissolving step 302. If the residual acid in the nickel-containing solution 322 causes excessive drop in current efficiency in the subsequent nickel electrowinning, it may be neutralized by a base such as sodium hydroxide before the solution 322 is recycled to the redissolving step 302. In a settling chamber or vessel, the aqueous and organic phases rapidly form separate immiscible layers due to the significant polarity differences between them. The organic phase is typically on top of the aqueous phase.

To elute the sulfuric acid from the organic phase, the organic phase is separated from the nickel-containing solution 322 and placed in a second agitated vessel, where the pH is raised to cause acid elution. Preferably, the eluant is water. To improve the acid elution efficiency from the organic phase, the elution can be operated at elevated temperature ranging from about 30 to 70° C. As has been noted, the mixed phases are typically separated using conventional equipment such as mixer/settler or pulsed column, where the acid-containing aqueous and barren organic phases rapidly form separate immiscible layers due to polarity differences. The acid-containing aqueous phase or acid product 326 is separated from the barren organic in a mixer/settler. The barren organic phase is recycled to the first vessel in the solvent extraction step 306.

A portion of the acid product 326 is typically recycled to the atmospheric leaching step 268, and/or the superatmospheric leaching step 290 (discussed below) and the remaining portion of the acid product passes to step 330.

In step 330, the remaining acid product 326 is neutralized using a suitable base, such as a hydroxide, an oxide, a carbonate, or a bicarbonate in an agitated vessel. Preferably, the acid product 326 is neutralized using lime or limestone. The amount of base employed typically ranges from about 105 to about 150% of the stoichiometric requirement.

The resulting product 334 is calcium sulfate (hydrated) or gypsum which may be discarded into the environment in a controller manner. Because the neutralizing step 330 is a deadend circuit, problems normally associated with the calcium scaling (such as lime or gypsum or calcium carbonate) will not affect nickel electrowinning, especially the blinding of the electrode bags. If any problems do in fact arise in the nickel electrowinning circuit, nickel sulfate crystals 294 can be readily stockpiled until the operational problem is solved without having to cease the operation of the base metal refinery.

Returning now to step 290, the first leach residue 278 is subjected to superatmospheric leaching at elevated temperature under oxidizing conditions to form a second pregnant leach solution containing at least most of the copper and nickel, and some of the selenium/tellurium and iron in the first leach residue 338, and a second leach residue 342 containing the bulk of the PGMs in the first leach residue 278. Selenium and tellurium as well as very minor amounts of PGMs are also typically dissolved in the leaching step 290. Preferably, the second pregnant leach solution 338 contains at least about 99% of the copper and nickel in the first leach residue 278, while the second leach residue 342 contains at least about 99% of the platinum and palladium in the converter matte 252.

The superatmospheric leach is typically performed in an autoclave, which can be equipped with a flash recycle, using a lixiviant containing a mineral acid, with sulfuric acid being preferred. The autoclave can be operated at a temperature between about 100 and about 200° C. The total pressure in the autoclave typically ranges from about 400 to about 2000 kPa, and the partial pressure of molecular oxygen from about 100 to about 950 kPa.

The leaching step 290 is typically performed by repulping the first leach residue 278 with aqueous sulfuric acid solution 295 in an autoclave feed tank. Defoaming agent can be added. The repulped first leach residue is then pumped into the multi-compartment autoclave with agitation in each compartment. Molecular oxygen is sparged through the lixiviant. For best results, a gassing impeller and sparge tube may be employed, such as described in U.S. Pat. No. 6,183,706 and copending U.S. patent application Ser. No. 09/561,256, filed Apr. 27, 2000, to King, et al., now U.S. Pat. No. 6,268,381 which are incorporated herein by reference. The slurry from the final compartment is discharged into a flash tank to reduce the temperature and pressure.

The second pregnant leach solution 338 and residue 342 are separated from one another in step 346 by techniques known to those of ordinary skill in the art. Preferably, the liquid/solid separation is performed by filtration using a PGM residue filter. The recovered second leach residue 342 may be further upgraded in PGM content in a third stage of leaching such as using formic acid before being subjected in step 350 to PGM recovery using any of a number of techniques known to those skilled in the art. The recovery of individual metals from the second leach residue 342 or after its upgrading is not covered by the teachings of this patent application.

The second pregnant leach solution 338 is treated in step 362 to remove dissolved selenium and tellurium. Selenium and tellurium are impurities, which negatively impact the formability of the copper into products such as wire or tubing. Typically, selenium and tellurium removal are performed by passing the second pregnant leach solution 338 through a heat exchanger, which raises the temperature to a temperature ranging from about 60 to about 120° C. before entering an autoclave or a pipe reactor. Aqueous sulfurous acid, sulfur dioxide, metabisulfite or sulfite is injected at the inlet of the reactor to precipitate the selenium, tellurium, and any minor quantities of dissolved PGMs from the solution 338.

In step 378, the second pregnant leach solution is then subjected to solid/liquid separation such as by passing the solution through a filter to form solid precipitates 382 and a purified second pregnant leach solution solution 386. The solid precipitates 382 comprise at least most of the selenium and tellurium and some of the PGMs in the second pregnant leach solution. In step 390, the selenium and tellurium products 392 and 394 respectively are recovered from the precipitates by conventional techniques.

The purified second pregnant leach solution 386 is then subjected to electrowinning 366 by known techniques to recover a copper product 370 and a lean electrolyte 374. While not wishing to be bound by any theory, it is believed that the following reactions occur:

The lean electrolyte 374 typically contains from about 10 to about 45 g/l copper and from about 20 to about 100 g/L sulfuric acid. The lean electrolyte 374 can be recycled to the atmospheric and/or superatmospheric leaching steps 268 and 290. Because the lean electrolyte 374 will contain at least most of the dissolved nickel in the second pregnant leach solution 338 and some dissolved copper, the lean electrolyte 374 is typically recycled to the atmospheric leaching step 290 so that the nickel can be recovered as part of the first pregnant leach solution 272 and the dissolved copper can assist in the metathasis reaction. The copper product 370 typically contains at least about 95% and more typically from about 98 to about 99.5% of the copper in the comminuted matte 264.

A number of variations and modifications of the invention can be used. It would be possible to provide for some features of the invention without providing others.

For example in one alternative embodiment, the first pregnant leach solution 272 is not subjected to crystallizing to produce nickel sulfate crystals. Part or all of the first pregnant leach solution 272 with or without prior concentration is directly passed to electrowinning step 310. Thus, there is no cost to run the crystallizer. An important consideration in this embodiment is to maintain a water balance in the circuit.

In another alternative embodiment, the first pregnant leach solution 272 is subjected to solvent extraction 306 before electrowinning is performed.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process for recovering at least one platinum group metal (PGM) and nickel from a material containing the at least one PGM and nickel, comprising:
    melting at least a portion of the material to form a furnace matte comprising at least most of the at least one PGM and the nickel in the at least a portion of the material and a furnace slag;
    contacting at least a portion of the furnace matte with an acid-containing lixiviant to form a pregnant leach solution comprising at least most of the nickel in the at least a portion of the furnace matte and a leach residue comprising at least most of the at least one PGM in the at least a portion of the furnace matte;
    electrowinning the nickel from at least one of the pregnant leach solution and a rich electrolyte derived therefrom to form a first product comprising at least most of the nickel in the at least a portion of the pregnant leach solution and a lean electrolyte comprising acid;
    solvent extracting at least a portion of the acid in at least one of the lean electrolyte, rich electrolyte, and pregnant leach solution to form an acid product and a treated electrolyte; and
    recovering at least most of the at least one PGM in the leach residue.

2. The process of claim 1, further comprising:
    comminuting the material to form a comminuted feed;
    floating the comminuted feed to form a concentrate comprising at least most of the at least one PGM and nickel in the material, wherein the at least a portion of the material comprises the concentrate.

3. The process of claim 1, wherein the contacting step comprises:
    converting the furnace matte to form a converter matte comprising at least most of the at least one PGM and nickel in the furnace matte and a converter slag, wherein the at least a portion of the furnace matte comprises the converter matte.

4. The process of claim 1, wherein in the contacting step at least most of the acid in the lixiviant is sulfuric acid and the lixiviant comprises from about 2 to about 40 g/l sulfuric acid and wherein the contacting step is conducted at a ambient pressure and an operating temperature ranging from about 85 to about 95° C.

5. The process of claim 1, wherein the electrowinning step comprises:
    crystallizing at least most of the nickel in at least a part of the first pregnant leach solution; and
    contacting the crystallized nickel with an acid to redissolve the crystallized nickel in the rich electrolyte, wherein the nickel is electrowon from the electrolyte.

6. The process of claim 5, wherein in the solvent extracting step from about 90 to about 99% of the acid in the rich electrolyte is in the acid product.

7. The process of claim 6, wherein the acid is sulfuric acid and further comprising:
    contacting at least a portion of the acid product with a base to form a salt product.

8. The process of claim 7, wherein the base is at least one of a hydroxide, a carbonate, a bicarbonate, and mixtures thereof.

9. The process of claim 8, wherein the treated electrolyte is recycled to the electrowinning step.

10. The process of claim 1, wherein the at least a portion of the material comprises copper and the leach residue comprises at least most of the copper in the at least a portion of the material, and the recovering step comprises:
    contacting at least a portion of the leach residue with a second acid-containing lixiviant at superatmospheric pressure to form a second pregnant leach solution comprising at least most of the copper in the at least a portion of the leach residue and a second leach residue comprising at least most of the at least one PGM in the at least a portion of the leach residue first the contacting step.

11. The process of claim 10, wherein at least most of the acid in the second lixiviant is sulfuric acid and further comprising:
    electrowinning the copper from at least a portion of the second pregnant leach solution to form a second product comprising at least most of the copper in the at least a portion of the second pregnant leach solution and a second lean electrolyte comprising at least most of the acid in the at least a portion of the second pregnant leach solution.

12. The process of claim 10, wherein in the contacting step of claim 10 at least most of the acid in the second acid-containing lixiviant is sulfuric acid and wherein the contacting step of claim 10 is conducted at a superatmospheric pressure and an operating temperature ranging from about 100 to about 250° C.

13. A process for recovering at least platinum group metal (PGM) and nickel from a material containing the at least one PGM and the at least one of copper and nickel, comprising:
    (a) forming at least a portion of the material into a furnace matte comprising at least most of the at least one PGM and the nickel in the at least a portion of the material and a furnace slag, wherein the furnace slag is from about 50 to about 95 wt % of the at least a portion of the material;
    (b) leaching with an acid-containing lixiviant at least a portion of the furnace matte to form a first pregnant leach solution comprising at least most of the nickel in the at least a portion of the furnace matte and a first leach residue comprising at least most of the at least one PGM in the at least a portion of the furnace matte;

(c) recovering the nickel from the first pregnant leach solution to form a first product comprising at least most of the nickel in the at least a portion of the first pregnant leach solution and an acid-containing lean solution;

(d) removing at least a portion of the acid from at least most of the lean solution to form an acid product and a treated lean solution;

(e) forming at least a portion of the acid product into a salt; and (f) recovering at least most of the at least one PGM in the first leach residue.

14. The process of claim 13, further comprising:

comminuting the material to form a comminuted feed;

floating the comminuted feed to form a concentrate comprising at least most of the at least one PGM and nickel in the material, wherein the at least a portion of the material comprises the concentrate.

15. The process of claim 13, wherein the leaching step comprises:

converting the furnace matte to form a converter matte comprising at least most of the at least one PGM and nickel in the furnace matte and a converter slag, wherein the at least a portion of the furnace matte comprises the converter matte and wherein the converter slag constitutes at least most of the furnace matte.

16. The process of claim 13, wherein in the leaching step at least most of the acid in the lixiviant is sulfuric acid and the lixiviant comprises from about 2 to about 40 g/l sulfuric acid and wherein the leaching step is conducted at ambient pressure and an operating temperature ranging from about 85 to about 95° C.

17. The process of claim 13, wherein the recovering step (c) comprises:

crystallizing at least most of the nickel in at least a part of the first pregnant leach solution; and contacting the crystallized nickel with an acid to redissolve the crystallized nickel in a lean electrolyte, wherein the at least a portion of the first pregnant leach solution in the recovering step (c) comprises the lean solution.

18. The process of claim 13, wherein in the removing step (d) from about 90 to about 99% of the acid in the lean solution is in the acid product.

19. The process of claim 18, wherein the acid is sulfuric acid and further comprising:

contacting at least a portion of the acid product with a base to form a salt product.

20. The process of claim 19, wherein the base is at least one of a hydroxide, a carbonate, a bicarbonate, and mixtures thereof.

21. The process of claim 20, wherein the treated lean solution is recycled to the recovering step (c) and the recovering step (c) comprises electrowinning.

22. The process of claim 13, wherein the at least a portion of the material comprises copper and the first leach residue comprises at least most of the copper in the at least a portion of the material, and the recovering step (f) comprises:

contacting at least a portion of the first leach residue with a second acid-containing lixiviant at superatmospheric pressure to form a second pregnant leach solution comprising at least most of the copper in the at least a portion of the first leach residue and a second leach residue comprising at least most of the at least one PGM in the first leach residue.

23. The process of claim 22, wherein at least most of the acid in the second lixiviant is sulfuric acid and further comprising:

electrowinning the copper from at least a portion of the second pregnant leach solution to form a second product comprising at least most of the copper in the at least a portion of the second pregnant leach solution and a lean electrolyte comprising at least most of the acid in the at least a portion of the second pregnant leach solution.

24. The process of claim 23, wherein the contacting step is conducted at superatmospheric pressure and an operating temperature ranging from about 100 to about 250° C.

25. A system for recovering at least platinum group metal (PGM) and nickel from a material containing the at least one PGM and nickel, comprising:

(a) first forming means for forming at least a portion of the material into a furnace matte comprising at least most of the at least one PGM and nickel in the at least a portion of the material and a furnace slag, wherein the furnace slag is from about 50 to about 75 wt % of the at least a portion of the material;

(b) leaching means for leaching with an acid-containing lixiviant at least a portion of the furnace matte to form a first pregnant leach solution comprising at least most of the nickel in the at least a portion of the furnace matte and a first leach residue comprising at least most of the at least one PGM in the at least a portion of the furnace matte;

(c) first recovering means for recovering the nickel from at least a portion of the first pregnant leach solution to form a first product comprising at least most of the nickel in the at least a portion of the first pregnant leach solution and a lean solution comprising at least most of the acid in the at least a portion of the first pregnant leach solution;

(d) removing means for removing at least a portion of the acid from at least most of the lean solution to form an acid product and a treated lean solution;

(e) second forming means for forming at least a portion of the acid product into a salt; and (f) second recovering means for recovering at least most of the at least one PGM in the first leach residue.

26. The system of claim 25, further comprising:

comminuting means for comminuting the material to form a comminuted feed; and flotation means for floating the comminuted feed to form a concentrate comprising at least most of the at least one PGM and nickel in the material, wherein the at least a portion of the material comprises the concentrate.

27. The system of claim 25, wherein the leaching means comprises:

converting means for converting the furnace matte to form a converter matte comprising at least most of the at least one PGM and nickel in the furnace matte and a converter slag, wherein the at least a portion of the furnace matte comprises the converter matte and wherein the converter slag is at least most of the furnace matte.

28. The system of claim 25, wherein in the leaching means at least most of the acid in the lixiviant is sulfuric acid and the lixiviant comprises from about 2 to about 40 g/l sulfuric acid and wherein the leaching means conducts leaching at ambient pressure and an operating temperature ranging from about 85 to about 95° C.

29. The system of claim 25, wherein the first recovering means comprises:
   crystallizing means for crystallizing at least most of the nickel in at least a part of the first pregnant leach solution; and
   redissolving means for redissolving the crystallized nickel in an acidic solution, wherein the at least a portion of the first pregnant leach solution in the recovering means comprises the lean solution.

30. The system of claim 25, wherein in the removing means from about 90 to about 99% of the acid in the lean solution is in the acid product.

31. The system of claim 30, wherein the acid is sulfuric acid and further comprising:
   neutralizing means for contacting at least a portion of the acid product with a base to form a salt product.

32. The system of claim 31, wherein the base is at least one of a hydroxide, a carbonate, a bicarbonate, and mixtures thereof.

33. The system of claim 25, wherein the at least a portion of the furnace matte comprises copper and the first leach residue comprises at least most of the copper in the at least a portion of the material, and the second recovering means comprises:
   means for contacting at least a portion of the first leach residue with a second acid-containing lixiviant at superatmospheric pressure to form a second pregnant leach solution comprising at least most of the copper in the at least a portion of the first leach residue and a second leach residue comprising at least most of the at least one PGM in the first leach residue.

34. The system of claim 33, wherein at least most of the acid in the second lixiviant is sulfuric acid and further comprising:
   electrowinning means for electrowinning the copper from at least a portion of the second pregnant leach solution to form a second product comprising at least most of the copper in the at least a portion of the second pregnant leach solution and a lean electrolyte comprising at least most of the acid in the at least a portion of the second pregnant leach solution.

* * * * *